United States Patent [19]

Wolfe

[11] 4,273,962

[45] Jun. 16, 1981

[54] IMPULSE METERING OF LOCAL TELEPHONE SWITCHING OFFICES VIA A DAMA DOMSAT COMMUNICATION SYSTEM

[75] Inventor: William H. Wolfe, Satellite Beach, Fla.

[73] Assignee: Harris Corporation, Cleveland, Ohio

[21] Appl. No.: 937,802

[22] Filed: Aug. 29, 1978

[51] Int. Cl.$^2$ ............... H04B 7/185; H04M 15/12
[52] U.S. Cl. ............................. 179/7.1 R; 179/7 R; 455/12
[58] Field of Search ............. 179/7 R, 7.1 R, 7 AM, 179/7.1 TP, 8 R, 8 A, 15 BY, 18 EA, 2 EB, 15 AT; 328/4

[56] References Cited

U.S. PATENT DOCUMENTS

| | | | |
|---|---|---|---|
| Re. 27,678 | 6/1973 | Orlomoski | 151/21 B UX |
| 113,557 | 4/1871 | Pearson | 151/22 X |
| 1,829,017 | 10/1931 | Saben | 151/37 |
| 2,330,511 | 9/1943 | Money | 151/21 B X |
| 3,176,746 | 4/1965 | Walton | 151/22 |
| 3,339,389 | 9/1967 | Mosow | 151/22 X |
| 3,548,108 | 12/1970 | Yomato et al. | 179/15 BY |
| 3,683,116 | 8/1972 | Dill | 325/4 |
| 3,764,747 | 10/1973 | Nakajima et al. | 179/7 R |
| 3,972,359 | 8/1976 | Thomas | 151/22 |
| 3,972,360 | 8/1976 | Cadwallader | 151/22 |
| 3,972,361 | 8/1976 | Ollis | 151/22 |
| 3,982,073 | 9/1976 | Baltzer et al. | 179/7.1 TP |
| 3,982,575 | 9/1976 | Ollis et al. | 151/22 |
| 4,090,034 | 5/1978 | Moylan | 179/7.1 R |

FOREIGN PATENT DOCUMENTS

| | | |
|---|---|---|
| 1356778 | 6/1974 | United Kingdom . |
| 1498874 | 1/1978 | United Kingdom . |
| 1514205 | 6/1978 | United Kingdom . |

Primary Examiner—Gerald L. Brigance
Attorney, Agent, or Firm—Craig & Antonelli

[57] ABSTRACT

Impulse metering at local telephone switching offices in a DAMA DOMSAT communication system involves the storage of billing rate information in the control computer equipment at a master station. This billing information is maintained in the form of a look-up table containing all billing rates to apply to toll calls. Since the control computer knows the identity of the calling and called offices, it can select the proper billing rate for the call. Respective relatively remotely located interface stations, to which local exchanges are connected for coupling a subscriber with the satellite link, contain signalling converter circuits which, in addition to interpreting the dialed telephone number and formatting digital signals containing the dialed information, forward digital signals to a DAMA system controller where the signals are formatted and combined with other signals being transmitted to the master station. The signal converter includes billing pulse metering circuitry which responds to billing rate information transmitted by the master station when the calling party answers the call. This billing rate information is in the form of an encoded digital message that accompanies the answer signal forwarded from the master station to the calling station. When the signal converter receives the answer signal, the signal is sent to the local telephone switching office and impulse metering is initiated in accordance with the encoded digital message that is latched in the signal converter and is used to generate impulses that are supplied to the local exchange via the supervisory transmission link. Once initiated, the impulse metering continues for the duration of the call, and is terminated automatically when the calling party hangs up or upon command from the control computer at the master station.

19 Claims, 9 Drawing Figures

METERING RELAY CONNECTION-OPENED LINE SIGNAL LEAD FOR PULSES

METERING RELAY CONNECTION-GROUNDED LINE SIGNAL LEAD FOR PULSES

METERING-RELAY CONNECTION-P-LEAD+50V PULSES

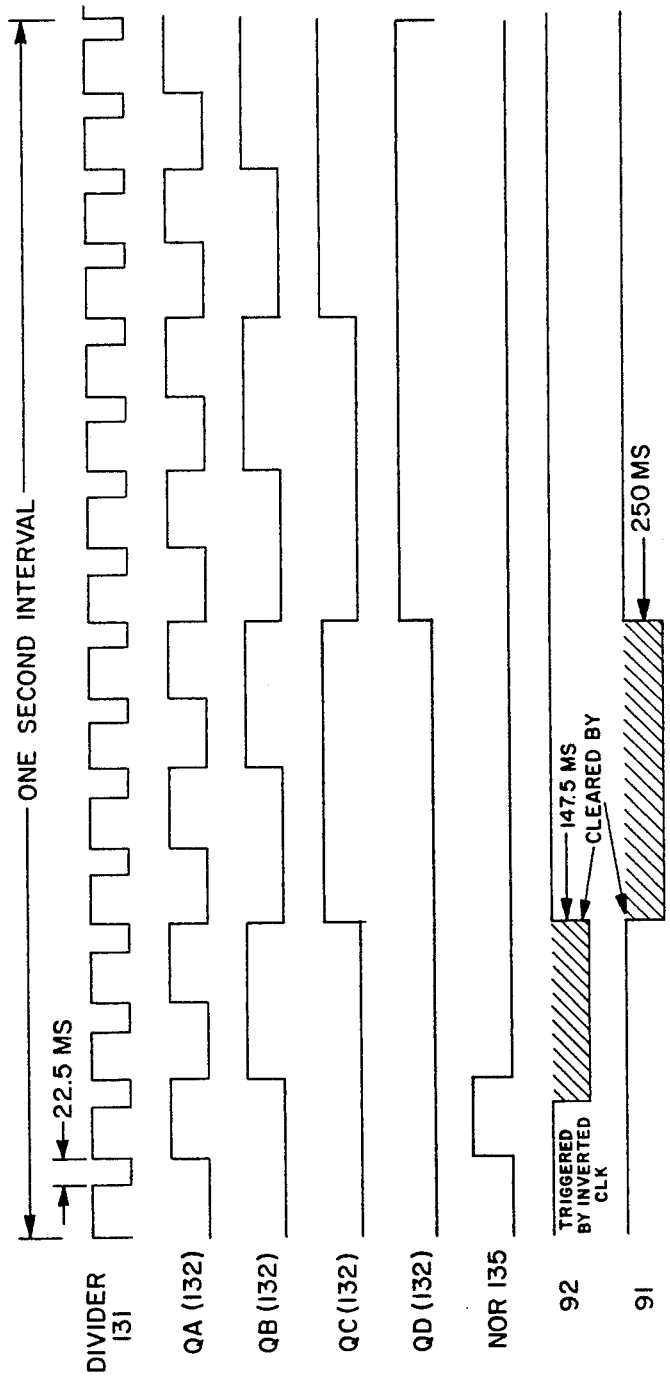

IMPULSE METERING OF LOCAL TELEPHONE SWITCHING OFFICES VIA A DAMA DOMSAT COMMUNICATION SYSTEM

FIELD OF THE INVENTION

The present invention relates to communication systems, and is particularly directed to a scheme for generating telephone billing information at a satellite earth station to which a local telephone exchange is coupled.

BACKGROUND OF THE INVENTION

One of the more efficient satellite communication systems is a DAMA (demand assigned multiple access) system which employs a limited number of satellite circuits controlled by a control computer located at a master station. In a DAMA system, all the satellite circuits are placed in a common pool and are assigned by the master station computer to the respective stations on demand. Upon completion of a call, the satellite circuits which were assigned to the stations participating in the call are returned to the pool so that they are available to be assigned to any other station when another call is placed.

In a DAMA network, the control computer at the master station may communicate with all the remote stations through a dedicated satellite channel, i.e. a common signalling channel (CSC), which provides a full-time, uninterrupted control link between the master station and the remote stations. Typically, the CSC modems of the remote and master stations operate on preassigned frequencies and may transmit digital signals between one another. These digital signals convey all the information that is required to set up a call through the satellite and to effect status monitoring of remote site equipment. One example of such a DAMA system is described in the U.S. patent to Yamato et al U.S. Pat. No. 3,548,108 and reference may be had thereto for a more detailed explanation of the various components employed in and operation of a DAMA satellite communication system.

Unfortunately, unlike terrestrial telephone networks, which employ a toll exchange to which a local exchange connects itself for the purposes of generating billing information, satellite communication systems do not require toll exchanges in the network hierarchy, so that an alternative measure is needed for generating billing pulses.

SUMMARY OF THE INVENTION

In accordance with the present invention, a solution to the above problem is implemented by a scheme which involves the storage of billing rate information in the control computer equipment at the master station. This billing information is maintained in the form of a look-up table containing all billing rates to apply to toll calls. Since the control computer knows the identity of the calling and called parties, it can select the proper billing rate for the call. Respective interface stations, to which local exchanges are connected for coupling a subscriber with the satellite link, contain signalling converter circuits which, in addition to interpreting the dialed telephone number and formatting digital signals containing the dialed information, forward digital signals to a DAMA system controller (DSC) where the signals are formatted and combined with other signals being transmitted to the master station. The signal converter includes billing pulse metering circuitry which responds to billing rate information transmitted by the master station when the calling party answers the call. This billing rate information is in the form of an encoded digital message that accompanies the answer signal forwarded from the master station to the calling station. When the signal converter receives the answer signal, the signal is sent to the local telephone switching office and impulse metering is initiated in accordance with the encoded digital message that is latched in the signal converter and is used to generate impulses that are supplied to the local exchange via the supervisory transmission link. Once initiated, the impulse metering continues for the duration of the call, and is terminated automatically when the calling party hangs up or upon command from the control computer at the master station.

BRIEF DESCRIPTION OF THE DRAWINGS

FIG. 7 is a timing diagram for explaining the operation of the logic timing circuit shown in FIG. 6.

DETAILED DESCRIPTION

Figure 1:
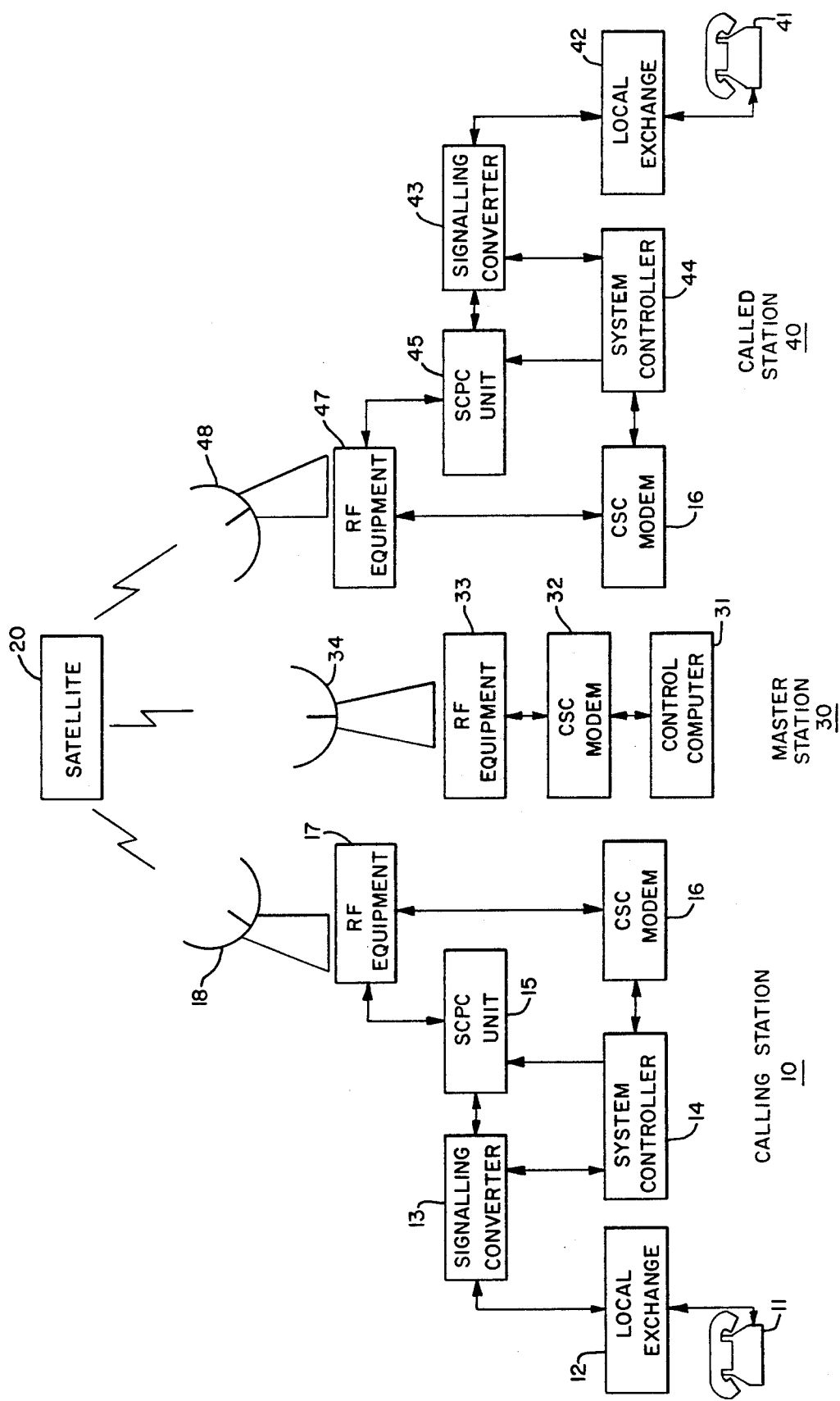
FIG. 1 is a general block diagram of a DAMA satellite communication system.

As was explained briefly above, in a DAMA satellite communication system, all the satellite circuits are pooled and are assigned, on demand, by the control computer located at a master station. FIG. 1 depicts the basic components that may make up such a DAMA system into which the present invention, to be described more fully below, may be incorporated. The overall communication system is comprised of a first station, identified as calling station 10, to which a local exchange 12 for receiving call requests from one or more calling subscribers 11 is coupled. Disposed at a geographically remote terrestrial location is a called station 40, to which its local exchange 42 for coupling calls to one or more called subscribers 41 is connected. Each station is configured of the necessary satellite communication equipment for transmitting and receiving messages via a satellite 20. In a DAMA system, the control of a call is carried out by a master station 30 which contains necessary supervisory, control, and communications equipment for forwarding control messages to each of the calling and called stations within the satellite network. This equipment includes a control computer 31 which stores information relating to each user of the network, such as geographical location, class of service identifications, billing rates, etc., that may be accessed as needed during the establishment and duration of a call. Control information, in the form of digital data, is coupled to and from computer 31 by a common signalling channel modem 32. As was described previously, by common signalling channel is meant a dedicated satellite channel which provides a full-time, uninterrupted control link between the master station 30 and the remote stations, e.g. calling and called stations 10 and 40. Typically, a separate control channel, over which control and status information is sent, is dedicated for each respective terrestrial station. The CSC modem 32 may comprise a narrowband PSK modem coupling digital messages between the control computer 31 and RF transceiver equipment 33 which, in turn, is coupled to antenna 34 for transmitting signals to and receiving signals from satellite 20.

Each of the terrestrial stations, such as calling station 10 and called station 40, that is remote from the master control station 30, is identically configured (since at any time each station may be coupled, via a local exchange, to a calling and/or called subscriber) and includes, as a necessary part of the satellite microwave link, an antenna 18 (or 48) and a RF transceiver unit 17 (or 47). The RF equipment 17 (or 47) is coupled to a common signalling channel modem 16 (or 46) through which control signals on the dedicated signalling channel, assigned to that particular remote station, are coupled to the DAMA system controller 14 (or 44) of the station. The DAMA system controller is essentially a microprocessor controlled communications multiplexer which examines messages received from the master station 30 and routes the messages to the appropriate subsystem such as signal converter unit 13 (or 43) or single channel per carrier (SCPC) unit 15 (or 45). Controller 14 (or 44) also receives messages from these subsystems and causes them to be transmitted via the RF equipment 17 (or 47) to master station 30.

SCPC unit 15 (or 45) contains the necessary modem equipment for coupling call messages between calling and called subscribers, once a pair of carrier frequencies have been assigned for a particular call by the master station. Telephone signalling converter 13 (or 43) interfaces signals between the satellite transmission system and the local exchange equipment of the terrestrial telephone network. Converter 13 (or 43) provides the appropriate line and register signalling interfaces for the telephone network and is coupled with the system controller 14 (or 44) to send signals to and receive signals from the control computer 31 at the master station 30.

In accordance with the present invention, converter 13 (or 43) includes impulse metering circuitry which responds to billing rate control signals that are forwarded from the control computer 31 at master station 30 when a called party answers a call. This impulse metering circuitry causes appropriate billing pulses to be sent to the local exchange of the calling party so that the necessary toll may be recorded. As was pointed out previously, in satellite communication networks, toll exchanges such as are employed in terrestrial telephone systems, are absent from the network hierarchy, and the present invention provides a scheme whereby toll billing may be simply and efficiently effected. Before describing the details of the impulse metering scheme of the present invention, the basic operation of a DAMA satellite communication system, of the type described briefly above, will be explained.

When a calling party, such as subscriber 11, lifts his handset and begins dialing, dialed telephone number signals are forwarded via the local exchange 12 to the telephone signalling converter 13 of the calling station 10. Of course, the signalling is not limited to only dialed pulsed number signals but may include other types of signalling, such as push-button frequency-pair signalling as commonly employed in terrestrial systems. Converter 13 interprets the called number and formats a digital message containing this information. This digital message which, in effect, is a request to establish a call with some remote subscriber 41, is coupled from converter 13 to the system controller 14 wherein it is placed in the proper format and multiplexed with other messages to be sent to the master station 30. Through the dedicated signalling channel assigned to the calling station 10, CSC modem 16 conveys the multiplexed signal from system controller 14 to RF equipment 17 for transmission via antenna/satellite link 18-20-34 to the RF receiver equipment 33 at master station 30.

At master station 30, the message from calling station 10 is demodulated by CSC modem 32 and routed to control computer 31. Control computer 31 identifies the calling station, determines which remote site is associated with the called subscriber, and allocates a pair of carrier frequencies to be used for the call. Control computer 31 then formats single channel per carrier control signals and sends these signals to the called and calling parties in order to establish a communications link between them. For billing purposes, pursuant to the invention to be described in detail below, control computer 31 contains, in memory, a look-up table from which the billing rate for each subscriber in the network may be derived based upon his geographical location, time, day of the week, etc. This billing rate information is accessed and encoded as part of an answer indication signal when the called party answers.

In addition to assigning the communications link frequencies to calling station 10 and called station 40, control computer 31 formats a set of digital signals containing the dialed telephone number and forwards this set of signals to CSC modem 32 for transmission to called station 40. At called station 40, these signals are coupled via CSC modem 46 to system controller 44. System controller 44 demultiplexes the dialed number code from the input signals and couples the dialed number to telephone signalling converter 43. Converter 43, which is coupled to the local exchange 42 to which the subscriber 41 for whom the call is intended is connected, seizes a local exchange circuit and begins sending the digits to the called subscriber resulting in the ringing of the called party's telephone 41. When the called party answers, a signal is coupled from the local exchange 42 to telephone signalling converter 43 at called station 40. Via system controller 44 and CSC modem 46, telephone signalling converter 43 sends a signal over its dedicated signalling channel to master station 30 indicating that the called subscriber 41 has answered. Thereupon, control computer 31 registers the call as being answered and sends an answer signal over the dedicated control channel assigned to calling station 10.

As was described briefly above and as will be explained in detail below, in accordance with the invention, the answer signal is accompanied by the billing rate code derived from the look-up table by control computer 31 at master station 30. An impulse metering circuit contained in telephone signalling converter 13 responds to this billing rate code and causes billing pulse signalling to the local exchange 12 to be initiated and to continue for the duration of the call. The telephone signalling converter 13 (or 43) automatically couples the voice link from local exchange 12 (or 42) to SCPC unit 15 (or 45) for the transmission of the call between the called station 40 and calling station 10, via satellite 20. Controller 14 (or 44) has caused SCPC unit 15 (or 45) to couple voice containing signals between RF equipment 17 (or 47) and signal converter 13 (or 43) for transmission to and from calling (called) subscriber 11 (or 41) via the local exchange 12 (or 42).

When the call is terminated, the telephone signalling converters at the respective calling and called stations advise the control computer 31 at the master station, so that the previously used pair of carrier frequencies will be available for another call. Impulse metering under control of the telephone signalling converter 13 at the called station is also halted by disconnection of the calling party 11 or upon command from control computer 31.

As was explained above, the present invention is directed to a scheme for simply and efficiently providing impulse metering of toll calls in a satellite telephone communication system. A general description of the basic components and operation of a DAMA satellite communication system has been presented in order to facilitate an understanding of the invention, to be described more fully below, as it is implemented in such a system. For a more detailed description of satellite communication systems, per se, including a DAMA type system, reference may be had to various literature relating to such systems. In addition to the above-referred to U.S. patent to Yamato et al U.S. Pat. No. 3,548,108, there include publications entitled "A Versatile DAMA System for Domestic Thin Route Telephone Traffic" by M. L. Sassier, in a paper presented at Intelcom 77, Atlanta, Georgia; Technical Note-"Demand Assignment Single Channel per Carrier System (DAMA SC/C)", by System Technology Associates, Inc.; "Demand Assigned Service for the INTELSAT Global Network" IEEE Spectrum, January, 1971; "Demand Assigned Multiple Access Techniques" EASCON 77; "Modulation Techniques for Multiple Access to a Hard-Limiting Satellite Repeater" by Schwartz et al; and an IBM publication entitled "Central Control Facility for a Satellite Communication System" by Blasbalg et al. The description to follow will describe the particular technique by way of which impulse metering may be advantageously effected in a DAMA system, particularly one employing separate dedicated signalling channels between the respective remote terrestrial stations and the master station.

Figure 2:
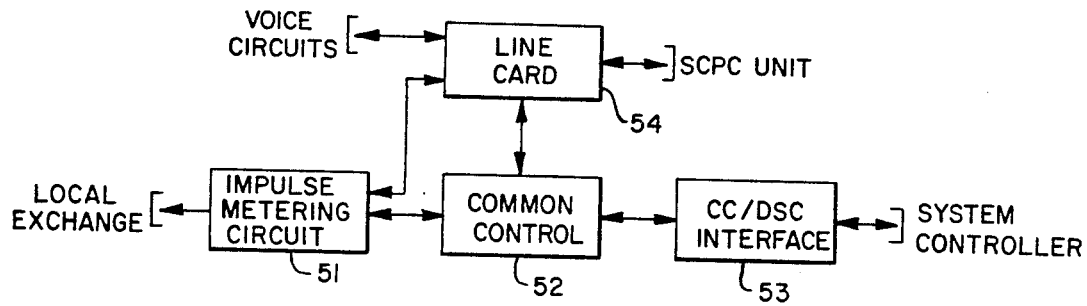
FIG. 2 is a general connection diagram of the impulse metering section of the signal converter circuit employed at an earth station.

Referring now to FIG. 2, there are shown those portions of the telephone signalling converter that relate to the impulse metering scheme in accordance with the present invention. Basically, a telephone signalling converter circuit includes those telephone interface and control circuit components necessary for detecting and formatting signals between the local telephone exchange and the satellite communication equipment. These components may include a plurality of line cards 54, which couple voice signals between the local exchange and the SCPC unit, register and abnormal condition monitoring cards (not shown), a common control 52 and interface circuits 53 which effectively buffer timing and control signals between the common control 52 and the system controller. Pursuant to the present invention, the telephone signalling converter is also provided with an impulse metering circuit 51 which responds to billing pulse control signals from the common control 52 as directed by the control computer at the master station over the CSC link and causes impulse metering to the local exchange.

Figure 3:
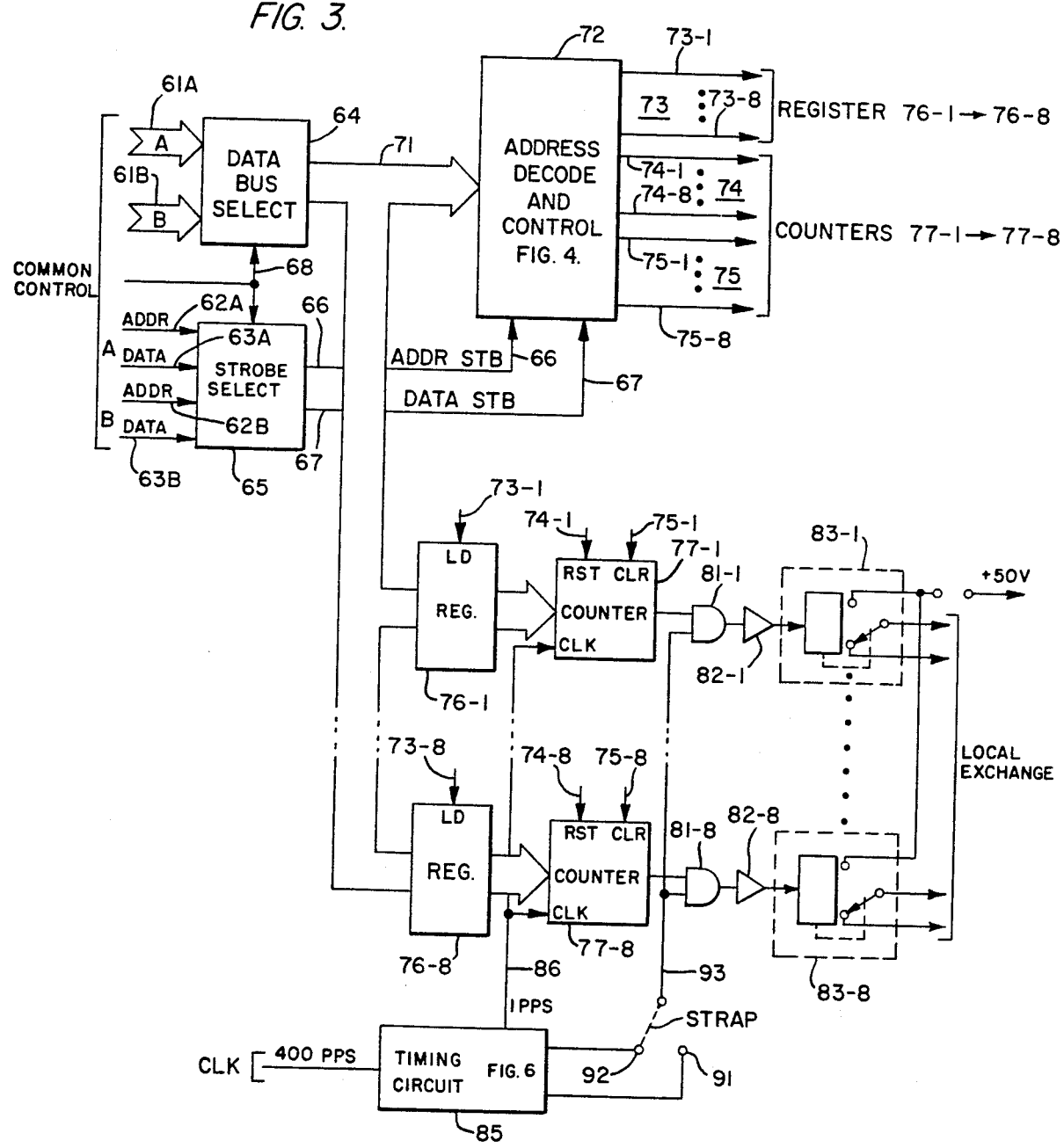
FIG. 3 is a detailed circuit diagram of the impulse metering circuit contained in the signal converter circuit.

FIG. 3 depicts, in detail, the configuration of the impulse metering circuitry in accordance with the invention. Preferably, as is often done for purposes of ensuring service continuity, the control portion of the system includes auxiliary or redundant equipment that may be placed into service immediately in the event of a failure in the control portion of the network, so that from the common control there are a pair of data busses 61A and 61B coupled to a data bus select switch or multiplexer 64. Address and data strobe or enabling signals from the common control are coupled in redundant pairs 62A, 63A and 62B, 63B to a strobe select switch or multiplexer 65. Line 68 is used to select which of the redundant units is in operation and normally couples the A lines through switches 64 and 65. From data bus select switch 64, a multibit (e.g. eight bit) data bus 71 couples control information, to be used in controlling the generation of metering impulses for a toll call, to address decode and control circuit 72 and to a plurality of registers 76-1 to 76-8. Address decode and control circuit 72, the details of which will be described below in conjunction with FIG. 4, decodes the contents of data bus 71 and controls which of the metering relay circuits that are coupled to the local exchange will be used for a call, and causes the latching or storage of a code representative of the billing rate to be used for the duration of the call. For this purpose, address decode and control circuit 72 has output control links 73, 74, and 75, each of which is comprised of a plurality of individual leads, connected to supply control signals to storage and counter circuitry associated with the respective metering relay circuits. For a capacity of up to eight metering relay circuits, each of links 73, 74, and 75 will contain up to eight control leads (73-1 to 73-8, 74-1 to 74-8, 75-1 to 75-8) connected to registers 76-1 to 76-8 and counters 77-1 to 77-8, as shown. When high, one of leads 73-1 to 73-8 will cause one of registers 76-1 to 76-8 to be loaded with the contents of data bus 71. Link 74 goes high to reset counters 77-1 to 77-8, while link 75 is used to terminate the operation of counters 77-1 to 77-8.

Counters 77-1 to 77-8 have their clock inputs (CLK) coupled via line 86 to a timing circuit 85 (the details of which will be described below in conjunction with FIG. 6) which divides a relatively high frequency timing pulse train (e.g. 400 pps) down to a frequency of 1 pps that is used to increment counters 77-1 to 77-8. Once enabled or reset, the counters count from their initially cleared values of zero up to the value designated by the code stored in the appropriate one of registers 76-1 to 76-8, recycle and repeat counting until a call termination or stop signal is supplied over link 75 by address decode and control circuit 72. Each time one of the counters reaches capacity and recycles, it supplies an output to one of AND gates 81-1 to 81-8. Gates 81-1 to 81-8 supply metering pulses to metering relay circuits 83-1 to 83-8 via amplifiers 82-1 to 82-8. The widths of these metering pulses, which are delivered to the local exchange over one of the E or P leads, are determined by a strapped connection between one of output terminals 91 and 92 of timing circuit 85 and line 93, which is common to a second input of each of AND gates 81-1 to 81-8. Thus, depending upon the strapping between line 93 and terminals 91 and 92, a respective one of AND gates 81-1 to 81-8 will couple either a 150 ms wide pulse or a 250 ms wide pulse at the recycling of its associated counter. This pulse will cause the generation of a corresponding pulse on the appropriate supervisory transmission link to the local exchange, depending upon the manufacture and type of local telephone switching office being served.

Figure 5A:
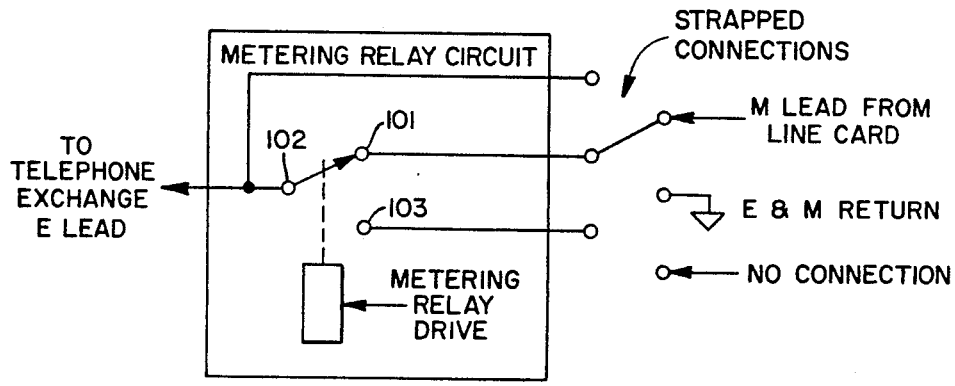
FIGS. 5A through 5C are detailed circuit connection diagrams of the metering impulse link connections between a local exchange and a signalling converter.
Figure 5B:
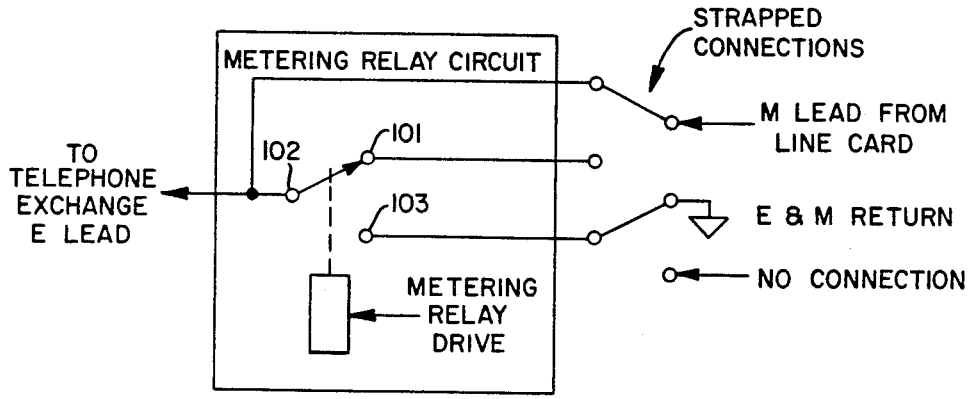
Figure 5C:
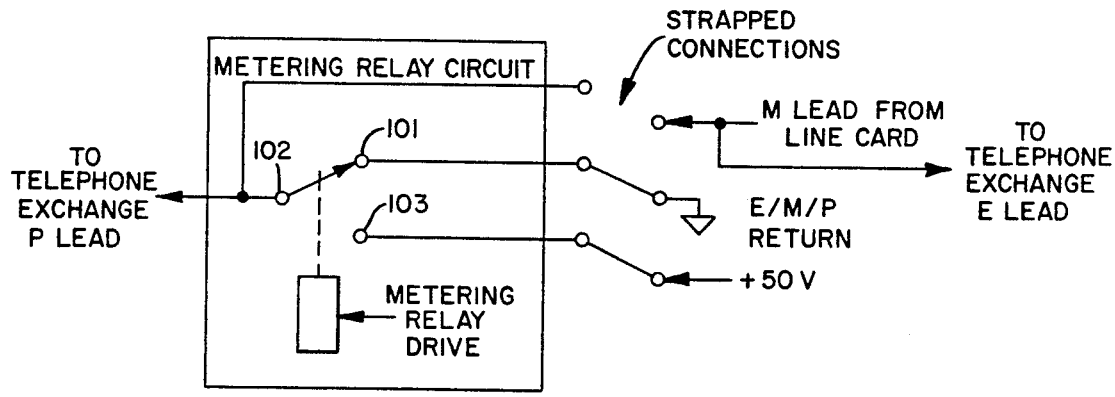

FIGS. 5A through 5C show various configurations that a metering relay circuit 83-n may take depending upon the above factors. FIG. 5A depicts a connection arrangement for an opened line signal lead for pulses. The M lead from the line card is strapped to the normally closed terminal 101 of the relay switch while the normally open terminal 103 is left floating, so that energization of the relay opens the connection between the E and M leads. The common terminal 102 is coupled to the E lead of the local exchange. In the configuration shown in FIG. 5B, the normally closed terminal 101 of the relay switch is open, but the common terminal 102 is strapped to the M lead from the line card and the E lead of the local exchange. The normally open terminal 103 of the relay switch is strapped to ground, so that energization of the relay grounds the E and M leads. In the configuration depicted in FIG. 5C, the common terminal 102 of the relay switch is connected to the P lead of the exchange, while the normally closed terminal 101 is strapped to ground. The normally open terminal 103 is strapped to +50 volts D.C., so that energization of the relay changes the P lead potential from ground to +50 volts D.C.

Figure 4:
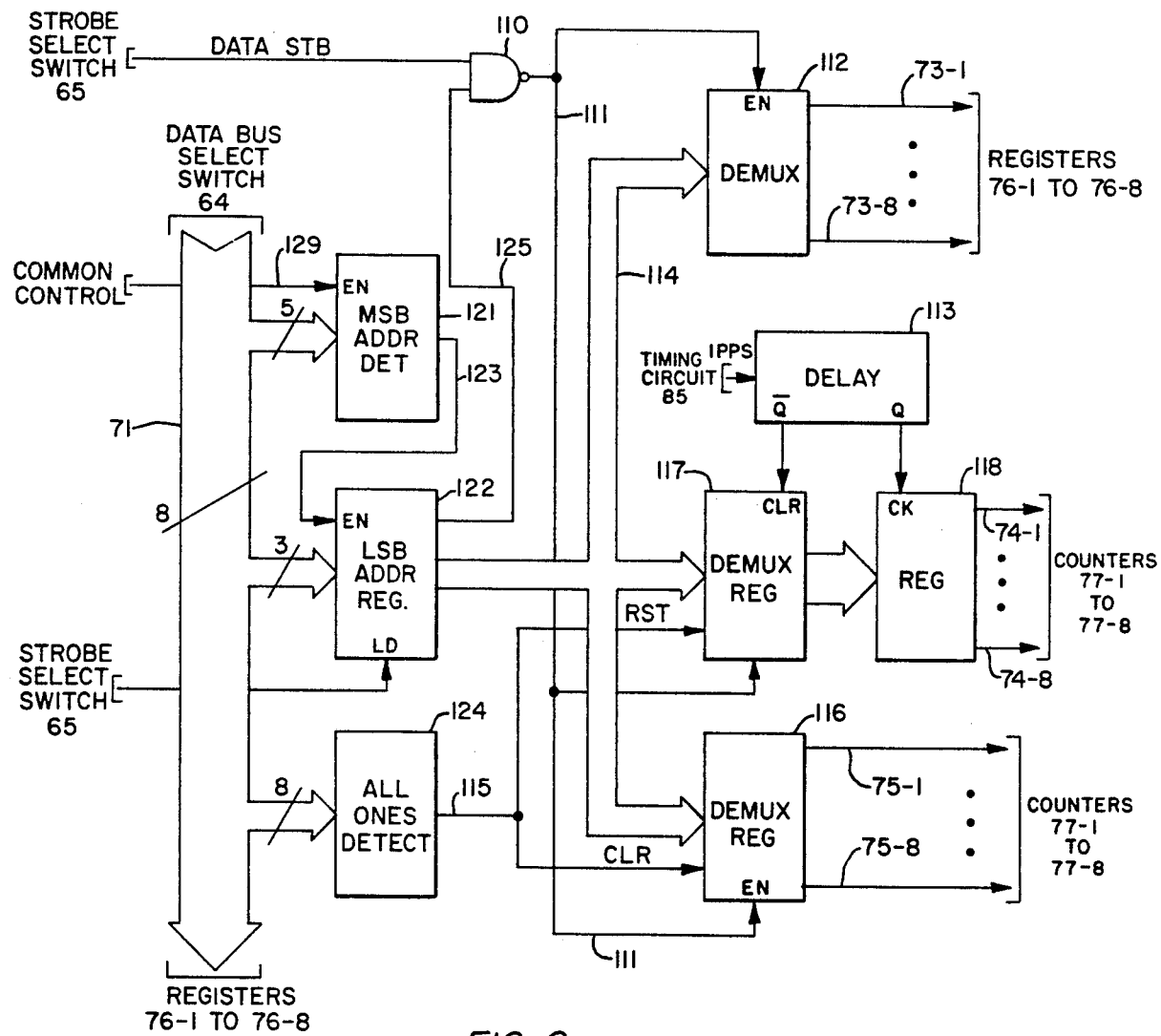
FIG. 4 is a detailed circuit diagram of an address decode and control circuit portion of an impulse metering circuit.

FIG. 4 illustrates, in detail, the logic circuitry of which address decode and control circuit 72 of FIG. 3 is comprised. Selected bits of data bus 71 from data bus select switch 64 are coupled to most significant bits address detector 121, least significant bits address register 122, and an all ones detector 124. Each of the detectors 121 and 124 may comprise appropriate combinational logic configured to supply enabling signals on leads 123 and 115 respectively in response to prescribed data codes on bus 71. Address detector 121 is coupled to the five most significant bits of bus 71 and generates an output when these five bits represent the I.D. of the impulse metering circuit of which it forms a part, so that the circuit will respond to subsequent data and provide impulse metering for the appropriate calling subscriber. Address detector 121 is enabled by the common control and, upon decoding the I.D. of its associated metering circuit, enables address register 122 via lead 123. The three LSBs of bus 71 are loaded into address register 122 in response to an address strobe load signal on line 66. These three bits represent one of the eight (000-111) metering relay circuits 83-1 to 83-8 and their associated input circuits. When an address has been loaded in address register 122, a signal is coupled over line 125 to NAND gate 110. NAND gate 110 is also coupled to data strobe lead 67 and has its output connected over lead 111 to the load enable or gate inputs of each of demultiplexer 112 and demultiplexer registers 116 and 117. When enabled by a verified data strobe signal on line 111, demultiplexer 112 causes one of leads 73-1 to 73-8 to go high in accordance with the three bit binary code on bus 114. Each of demultiplexer registers 116 and 117 stores the three bit code on bus 114 when enabled by the data strobe signal on lead 111, and couples input lead 115 to the output defined by the three bit code. Lead 115 is coupled to the output of an all ones detector 124 which monitors the contents of data bus 71 for a call termination/reset code from the comon control. When a call is terminated, impulse metering is halted and registers and counters used during the call are cleared. An eight bit all ones code is used for this purpose, with detector 124 initiating the resetting and clearing of the necessary circuits. In respone to a signal on lead 115, demultiplexer register 116 supplies a STOP signal on the designated one of leads 75-1 to 75-8. Similarly, demultiplexer register 117 causes the appropriate counter to be reset. Register 117 and associated register 118 are coupled to the Q and $\overline{Q}$ outputs of monostable multivibrator (one-shot) or delay 113. Delay 113 is closed by a 1 pps pulse from timing circuit 85 and provides the necessary time offset for resetting the counters used to generate the metering pulses. The outputs of register 118 are coupled to the reset inputs of counters 77-1 to 77-8.

Figure 6:
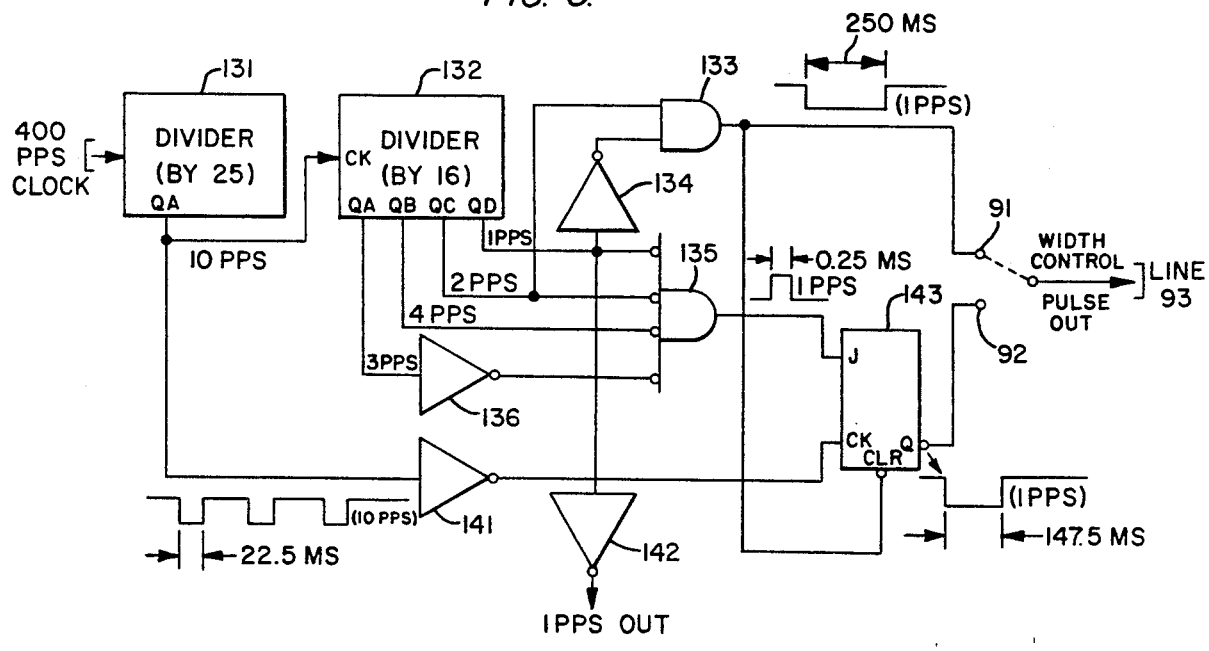
FIG. 6 is a detailed logic circuit diagram of the impulse timing control circuitry portion of FIG. 3.

FIG. 6 illustrates the constituent circuit components of timing circuit 85. A 400 pps signal from the system clock is applied to a divide-by-twenty-five divider stage 131, the 16 pps output of which is coupled to the clock or increment input of a divide-by-sixteen stage 132, and, via inverter 141, to the clock input of flip-flop 143. The respective QB–QD outputs of divider 132 are coupled to NOR gate 135, while the QA output of divider 132 is inverted by inverter 136 and then applied to an input of NOR gate 135. Inverter 142 is coupled to the QD output of the fourth stage of divider 132 to supply a 1 pps signal at its output. Inverter 134 is also coupled to the QD output of divider 132 while its QC output (2 pps) is coupled to one input of AND gate 133. The outer input of AND gate 133 is coupled to the output of inverter 134. The output of AND gate 133 is coupled to the direct clear input of flip-flop 143 and output terminal 91. The output of NOR gate 135 is coupled to the set input flip-flop 143. The $\overline{Q}$ output of flip-flop 143 is connected to output terminal 92.

A detailed timing diagram of various signals present in the timing circuit 85 is shown in FIG. 7. From the combinational logic employed in the timing circuit, respective 147.5≃150 ms and 250 ms width pulses, offset in time relative to each other, are available at terminals 92 and 91 respectively. One of these pulse terminals is strapped to line 93 for controlling the break time of the relay switch of the respective metering relays.

IMPULSE METERING OPERATION

As is described above in the explanation of the general operation of a DAMA system as illustrated in FIG. 1, control and status information for a call is communicated between a remote station and the master station by way of a dedicated signalling channel. When a call is being placed from a calling station, via the master station, to a called station, the control computer at the master station, knowing the identity of the calling and called offices, may access a stored look-up table for deriving the proper billing rate to be used for a particular call. Other factors, such as time of day, date, day of the week, etc., are further supplied as input data in addressing the appropriate memory location that contains the proper billing rate or metering relay impulse rate to be used. When the called subscriber answers, digital control data is forwarded from the control computer to the calling station. This digital control data is typically in serial format, containing header, control, address, and data fields in accordance with present day digital communication techniques. In accordance with the present invention, part of the data contains information relating to the billing rate that will be used to generate the proper toll at the local exchange to which the calling station is connected. The control computer, knowing the identity of the calling office, and having obtained the appropriate billing or impulse metering rate from memory, generates appropriate data words as part of the data field making up the answer indication message sent from the master station to the calling station.

When the answer message is demodulated by the CSC modem 16 in the calling station 10 and routed by the system controller 14 to the telephone signalling converter 13, the required data is coupled via the common control/DSC interface 53 to the common control 52 (FIG. 2). The common control supplies a pair of codes to the impulse metering circuit 51 so that impulse metering to the local exchange will proceed in accordance with the billing rate data generated by the control computer 31 at the master station 30.

Referring now to FIGS. 3 and 4, it will be assumed that the A portion of the redundant system is operational so that lead 68 from the common control causes switches 64 and 65 to couple signals from system A to their respective outputs. Initially, assuming that the registers associated with the local telephone circuit of interest have been cleared, as explained above in conjunction with FIG. 4, the address of the metering circuit and the address of the metering relay to be used are supplied as part of the data byte coupled over bus 61A and 71 to address decode and control circuit 72. Address detector 121 is enabled via lead 129 to decode the most significant five bits of the eight bit byte coupled over data bus 71. Upon recognizing its address, detector 121 enables address register 122, via line 123. The address of the metering relay circuit used to bill the calling subscriber is then strobed into register 122 upon the generation of an address strobe signal on line 66 from the common control. With the three least significant bits of the address byte loaded into register 122, an enable signal is coupled via line 125 to gate 110. Also, the address of the metering relay circuit is coupled to demultiplexer 112 and demultiplexer registers 116 and 117.

Following the address byte, the common control supplies a data byte containing a code representative of the impulse metering rate by which the calling subscriber is to be billed. This impulse rate word is coupled over the data bus 71 and applied to the data inputs of registers 76-1 to 76-8. When a data strobe or load enable signal is next supplied from the common control over lead 67, NAND gate 110 supplies a load enable or gate signal over line 111. In response to this signal, demultiplexer 112 supplies a load signal over one of lines 73-1 to 73-8 that corresponds to the address of the metering relay circuit coupled via address bus 114. Assuming that the address code stored in register 122 is the code 101, then line 73-5 will cause register 76-5 to be loaded with the data on bus 71. This data byte corresponds to the upper count limit that counter 77-5 must reach before recycling. With counter 77-5 having been reset to zero, it is now incremented by the 1 pps clock supplied by timing circuit 85. Upon reaching the capacity code defined by the contents of register 76-5, counter 77-5 recycles and supplies an output to AND gate 81-5. Depending upon the strapping between line 93 and terminals 91 and 92, at this time either a 250 ms or approximately 150 ms pulse will be supplied at the output of AND gate 81-5. This pulse is amplified by amplifier 82-5 and supplied as a relay drive input to metering relay circuit 83-5. The movable switch arm of the metering relay circuit switches from normally closed contact 101 to normally open contact 103 for the duration of the 150 ms or 250 ms pulse and then returns to normally closed contact 101. This break in the relay switch connection (e.g. for a configuration as shown in FIGS. 5A-5C) is transmitted to the local exchange to be registered as a billing impulse for the purpose of generating the required toll for the calling subscriber.

The above counting and metering operation continues until the call is terminated, either by the calling subscriber 11 or upon command from the control computer 31 at the master station 30, at which time the common control 52 within the telephone signalling converter 13 supplies an eight bit byte of all ones over data bus 71. In response to this byte, detector 124 supplies a signal over lead 115, causing lines 74-5 and 75-5 to reset and clear counter 77-5, respectively, thereby preventing the further coupling of either the 150 or 250 ms pulse through gate 81-5, so the metering relay circuit 83-5 is no longer pulsed for that call.

The above series of operations may take place for a desired plurality of metering relay circuits depending upon the particular configuration chosen. Thus, while up to eight relay circuits per impulse metering circuit have been described in the above example, it will be appreciated that the invention is not limited thereto, but is applicable to any appropriate number provided, of course, the number of corresponding circuits and data code bits are properly selected.

With the incorporation of an impulse metering circuit within the telephone signalling converter, in accordance with the invention as described above, and taking advantage of the data storage and control facilities of the master station, the generation of billing information at the local exchange, absent the existence of a separate toll exchange, may be efficiently effected.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. In a communication network wherein a communication link between relatively remotely located calling and called subscribers is established by a control facility separate and remote from respective calling and called stations to which said calling and called subscribers are coupled by way of associated local telephone exchanges, a system for supplying toll metering information to the local telephone exchange to which the calling subscriber is coupled comprising:
   first means, located at said control facility, for storing data representative of the toll metering rate applicable to the call between said calling and called subscribers and for forwarding a message representative of said data to said calling station to which the local telephone exchange associated with said calling subscriber is coupled; and
   second means, located at said calling station, and responsive to said message from said control facility, for generating metering impulse signals corresponding to said applicable toll metering rate and supplying said metering impulse signals to the local telephone exchange to which said calling subscriber is coupled.

2. A system according to claim 1, wherein said second means contains:
   a plurality of metering impulse generating circuits to which the local telephone exchange associated with the calling subscriber may be respectively connected, third means for storing a code identifying one of said metering impulse generating circuits in accordance with said message, and fourth means, coupled to said third means, for causing that one of said metering impulse generating circuits identified by said stored code to generate said metering impulse signals and to supply said metering impulse signals to the local telephone exchange associated with the calling subscriber.

3. A system according to claim 2, wherein said fourth means comprises:

fifth means, coupled to receive a series of clock pulse signals, for counting said clock pulse signals and generating an output for each successive plurality of clock pulses reaching a quantity representative of said applicable toll metering rate, and sixth means, coupled to said fifth means, for causing a metering impulse signal to be generated upon the generation of an output by said fifth means.

4. A system according to claim 3, further including seventh means, coupled between each respective metering impulse generating circuit and the local telephone exchange associated with the calling subscriber, for selectively modifying a supervisory information transmission connection between the local telephone exchange associated with said calling subscriber and a respective metering impulse generating circuit.

5. A system according to claim 1, wherein said communication network is a satellite telephone communication network, with relatively remotely located calling and called stations to which said calling and called subscribers are respectively coupled through their local telephone exchanges, communicating with said control facility over a satellite communication link.

6. A system according to claim 5, wherein said satellite telephone communication network comprises a demand assigned multiple access network having a separate signalling channel dedicated between each respective remote station and said control facility, said message from said control facility to said calling station being transmitted over the signalling channel dedicated thereto.

7. A system according to claim 6, wherein said second means contains:

a plurality of metering impulse generating circuits to which the local telephone exchange associated with the calling subscriber may be respectively connected, third means for storing a code identifying one of said metering impulse generating circuits in accordance with said message, and fourth means, coupled to said third means, for causing that one of said metering impulse generating circuits identified by said stored code to generate said metering impulse signals and to supply said metering impulse signals to the local telephone exchange associated with a calling subscriber.

8. A system according to claim 7, wherein said fourth means comprises:

fifth means, coupled to receive a series of clock pulse signals, for counting said clock pulse signals and generating an output for each successive plurality of clock pulses reaching a quantity representative of said applicable toll metering rate, and sixth means, coupled to said fifth means, for causing a metering impulse signal to be generated upon the generation of an output by said fifth means.

9. A system according to claim 8, further including seventh means, coupled between each respective metering impulse generating circuit and the local telephone exchange associated with the calling subscriber, for selectively modifying a supervisory information transmission connection between the local telephone exchange associated with said calling subscriber and a respective metering impulse generating circuit.

10. In a communication network wherein a communication link between relatively remotely located calling and called subscribers is established by a control facility separate and remote from respective calling and called stations to which said calling and called subscribers are coupled by way of associated local telephone exchanges, a method for supplying toll metering information to the local telephone exchange to which the calling subscriber is coupled comprising the steps of:

(a) storing, at said control facility, data representative of the toll metering rate applicable to the call between said calling and called subscribers;

(b) forwarding a message representative of said data from said control facility to said calling station to which the local telephone exchange associated with said calling subscriber is coupled;

(c) generating, at said calling station, in response to said message from said control facility, metering impulse signals corresponding to said applicable toll metering rate; and (d) supplying said metering impulse signals to the local telephone exchange to which said calling subscriber is coupled.

11. A method according to claim 10, wherein said calling station contains a plurality of metering impulse generating circuits to which the local telephone exchange associated with the calling subscriber may be respectively connected and said step (c) includes the steps of:

(c-i) storing a code identifying one of said metering impulse generating circuits in accordance with said message, and (c-ii) causing that one of said metering impulse generating circuits identified by said stored code to generate said metering impulse signals to be supplied in step (d) to the local telephone exchange associated with the calling subscriber.

12. A method according to claim 11, wherein said step (c-ii) includes the steps of:

(c-ii-1) generating a series of clock pulse signals, (c-ii-2) counting said clock pulse signals, (c-ii-3) generating a prescribed signal upon each successive plurality of clock pulses reaching a quantity representative of said applicable toll metering rate, and (c-ii-4) causing a metering impulse signal to be generated in response to said prescribed signal.

13. A method according to claim 12, wherein step (d) includes the step of selectively modifying a supervisory information transmission connection between the local telephone exchange associated with the calling subscriber and calling a respective metering impulse generating circuit.

14. A method according to claim 10, wherein said communication network is a satellite telephone communication network, with relatively remotely located calling and called stations to which said calling and called subscribers are respectively coupled through their local telephone exchanges, communicating with said control facility over a satellite communication link.

15. A method according to claim 14, wherein said satellite telephone communication network comprises a demand assigned multiple access network having a separate signalling channel dedicated between each respective remote station and said control facility, said message forwarded from said control facility to said calling station in step (c) being transmitted over the signalling channel dedicated thereto.

16. A method according to claim 15, wherein said calling station contains a plurality of metering impulse generating circuits to which the local telephone exchange associated with the calling subscriber may be respectively connected and said step (c) includes the steps of:
(c-i) storing a code identifying one of said metering impulse generating circuits in accordance with said message, and
(c-ii) causing that one of said metering impulse generating circuits identified by said stored code to generate said metering impulse signals to be supplied in step (d) to the local telephone exchange associated with the calling subscriber.

17. A method according to claim 16, wherein said step (c-ii) includes the steps of:
(c-ii-1) generating a series of clock pulse signals,
(c-ii-2) counting said clock pulse signals,
(c-ii-3) generating a prescribed signal upon each successive plurality of clock pulses reaching a quantity representative of said applicable toll metering rate, and
(c-ii-4) causing a metering impulse signal to be generated in response to said prescribed signal.

18. A method according to claim 17, wherein step (d) includes the step of
selectively modifying a supervisory information transmission connection between the local telephone exchange associated with the calling subscriber and a respective metering impulse generating circuit.

19. In a demand assigned multiple access satellite telephone communication network having relatively remotely located calling and called stations to which respective calling and called subscribers are coupled through local telephone exchanges associated therewith, wherein a communication link between said subscribers is established by a control facility remote from each of said stations via said satellite by way of respective separate signalling channels dedicated between said control facility and said remote calling and called stations, a system for supplying toll metering information to the local telephone exchange to which the calling subscriber is coupled, comprising:
first means, located at said control facility, for storing data representative of the toll metering rate applicable to a call between said calling and called subscribers, and responsive to the placement of a call by said calling subscriber and an answer thereto by said called subscriber, for transmitting a message representative of said data to said calling station by way of its dedicated signalling channel; and
second means, located at said calling station, and responsive to said message from said control facility, for generating metering impulse signals corresponding to said applicable toll metering rate and forwarding said metering impulse signals to its associated local telephone exchange to which said calling subscriber is coupled.

* * * * *